(12) United States Patent
Major et al.

(10) Patent No.: US 6,862,606 B1
(45) Date of Patent: Mar. 1, 2005

(54) SYSTEM AND METHOD FOR PARTITIONING ADDRESS SPACE IN A PROXY CACHE SERVER CLUSTER

(75) Inventors: Robert Drew Major, Orem, UT (US); Stephen R Carter, Spanish Fork, UT (US); Howard Rollin Davis, Salem, UT (US); Brent Ray Christensen, Cedar Hills, UT (US)

(73) Assignee: Novell, Inc., Provo, UT (US)

( * ) Notice: Subject to any disclaimer, the term of this patent is extended or adjusted under 35 U.S.C. 154(b) by 659 days.

(21) Appl. No.: 09/877,918

(22) Filed: Jun. 7, 2001

Related U.S. Application Data (63) Continuation of application No. 09/853,290, filed on May 11, 2001.

(51) Int. Cl.$^7$ .............................................. G06F 15/16
(52) U.S. Cl. ...................... 709/203; 709/224; 709/225; 709/223
(58) Field of Search ................................ 709/224, 223, 709/203, 226, 225

(56) References Cited

U.S. PATENT DOCUMENTS

| | | |
|---|---|---|
| 5,642,511 A | 6/1997 | Chow et al. |
| 5,784,566 A | 7/1998 | Vivan et al. |
| 5,924,116 A | 7/1999 | Aggarwal et al. |
| 5,961,593 A | 10/1999 | Gabber et al. |
| 5,964,891 A | 10/1999 | Caswell et al. |
| 5,999,734 A | 12/1999 | Willis et al. |
| 6,014,667 A | 1/2000 | Jenkins et al. |
| 6,016,310 A * | 1/2000 | Muller et al. ............... 370/255 |
| 6,018,619 A | 1/2000 | Allard et al. |
| 6,112,228 A | 8/2000 | Earl et al. |
| 6,151,688 A | 11/2000 | Wipfel et al. |
| 6,185,598 B1 | 2/2001 | Farber et al. |
| 6,185,625 B1 | 2/2001 | Tso et al. |
| 6,438,652 B1 * | 8/2002 | Jordan et al. ............... 711/120 |

OTHER PUBLICATIONS

U. S. Appl. No. 09/195,982, Christensen et al.
U. S. Appl. No. 09/337,241, Major et al.

* cited by examiner

Primary Examiner—Kimberly McLean-Mayo
(74) Attorney, Agent, or Firm—Schwegman, Lundberg, Woessner & Kluth, P.A.

(57) ABSTRACT

A proxy partition cache (PPC) architecture and a technique for address-partitioning a proxy cache consisting of a grouping of discrete, cooperating caches (servers) is provided. Client requests for objects (files) of a given size are redirected or reassigned to a single cache in the grouping, notwithstanding the cache to which the request is made by the load-balancing mechanism (such as a Layer 4 switch) based upon load-balancing considerations. The file is then returned to the switch via the switch-designated cache for vending to the requesting client. The redirection/reassignment occurs according to a function within the cache to which the request is directed so that the switch remains freed from additional tasks that can compromise speed.

19 Claims, 5 Drawing Sheets

SYSTEM AND METHOD FOR PARTITIONING ADDRESS SPACE IN A PROXY CACHE SERVER CLUSTER

CROSS-REFERENCE TO RELATED APPLICATIONS

The present application is a continuation of commonly assigned co-pending U.S. patent application Ser. No. 09/853,290, which was filed on May 11, 2001, by Robert Drew Major et al. for a SYSTEM AND METHOD FOR PARTITIONING ADDRESS SPACE IN A PROXY CACHE SERVER CLUSTER hereby incorporated by reference. This application is also related to commonly owned U.S. patent application Ser. No. 09/195,982 entitled PROXY CACHE CLUSTER by Brent RF Christensen, et al. and U.S. patent application Ser. No. 09/337,241, entitled CACHE OBJECT STORE, by Robert Drew Major, the teachings of which applications are expressly incorporated herein by reference.

BACKGROUND OF THE INVENTION

1. Field of the Invention

The present invention relates to services of communications networks and, more specifically, to a system and method for increasing the availability of services offered by a service provider of a communications network.

2. Background Information

It is increasingly common for users having standalone computers, or computers interconnected by an institutional intranet or local area network, to gain access to various remote sites (such as those on the "World Wide Web") via the well-known Internet communications network. Using resident web browser applications executing on the computers, these clients may navigate among services ("pages") stored on various servers of a service provider ("web site") and may further request these services as desired. In a basic network communication arrangement, clients are free to access any remote web site for which uniform resource locators (URLs) are available.

It is also increasingly common in network applications to provide the web site servers with associated proxy cache servers that link ("front-end") the servers with the Internet. A proxy cache server ("proxy") may be used to accelerate client access to the Internet ("forward proxy"), to accelerate Internet access to a web server ("reverse proxy"), or to accelerate Internet access transparently to either client access or web server access ("transparent proxy"). As for the latter reverse proxy environment, the proxy may access frequently requested services from the web servers and store ("host") them locally to effectively speed-up access to future requests for the services. For instance, a proxy may host frequently requested web pages of a web site. In response to a request from a browser executing on a client, the proxy attempts to fulfill that request from its local storage. If it cannot, the proxy forwards the request to a web site server that can satisfy the request. The web server then responds by transferring a stream of information to the is proxy, which stores and forwards the information over the Internet onto the client. The illustrative embodiment of the invention described herein is applicable to a proxy environment As Internet traffic to the web site increases, the network infrastructure of the service provider may become strained attempting to keep up with the increased traffic. In order to satisfy such demand, the service provider may increase the number of network addresses for a particular service by providing additional web servers and/or associated proxies. These network addresses are typically Transmission Control Protocol/Internet Protocol (TCP/IP) addresses that are represented by URLs or wordtext (domain) names and that are published in a directory service, such as the well-known Domain Name System (DNS). Computers referred to as name servers implement DNS by mapping between the domain names and TCP/IP address(es).

In the case of a "reverse proxy," the proxies "front-end" the web servers (and may, in fact, be resident on the web servers) and the network addresses of the proxies (rather than the actual web site) are generally mapped to the domain name of the service provider. As a result, communication exchanges with the proxies generally comprise IP packets or UDP/TCP-socketed traffic, such as socket requests and responses. A socket is essentially an interface between an application layer and transport layer of a protocol stack that enables the transport layer to identify which application it must communicate with in the application layer. For example, a socket interfaces to a TCP/IP protocol stack via a set of application programming interfaces (API) consisting of a plurality of entry points into that stack. Applications that require TCP/IP connectivity typically utilize the socket API to interface into the TCP/IP stack.

For a connection-oriented protocol such as TCP, the socket may be considered a session; however, for a connectionless protocol such as IP datagram using the User Datagram Protocol (UDP), the socket is an entity/handle that the networking software (protocol stack) uses to uniquely identify an application layer end point, typically through the use of port numbers. The software entity within the server that manages the communication exchanges is a TCP/IP process, which is schematically illustrated as layers of a typical Internet communications protocol stack. Protocol stacks and the TCP/IP reference model are well-known and are, for example, described in *Computer Networks* by Andrew S. Tanenbaum, printed by Prentice Hall PTR, Upper Saddle River, N.J., 1996.

The popularity of Internet caching, due to the increased efficiencies it offers, has led to the construction of caching architectures that link multiple proxy cache servers in a single site. The servers may service an even larger cluster of content servers. The proxy cache servers are sometimes accessed via a Layer 4 (LA) switch that is tied to the site's edge router. The L4 switch is generally responsible for load-balancing functions across the cache. By load-balancing it is meant that the switch assigns requests to various caches based upon a mechanism that attempts to balance the usage of the caches so that no single cache is over-utilized while taking into account any connection context associated with the client requesting the dataflow.

Requests by users to various sites for large files have grown significantly. One particular class of often-requested files is feature-length movies stored using MPEG-2 compression or another standard. These files may easily exceed 1 gigabyte of storage. Moreover, certain movies in a site (highly popular releases) may be accessed continuously in a given period. Problems specific to the vending of large files have been observed. Conventional caches have become severely congested because of the time required to vend a file to a remote user/client. Part of this problem results from the low bandwidth of many clients (often using slower connections) that tends to tie up the server for hours on the vending of a single large file, and the fact that certain files are being vended much more often than others. Specifically, when a large proportion of the cache is being devoted to large files (over 50 Kbytes) and many requests are being made for the same file, the cache structure will become quickly filled with these large files. The problem is compounded by the load-balancing function of an L4 switch because all caches tend to be populated with the same large files. This loading of all caches occurs, in part, because the L4 switch is designed to provide load-balancing across all caches in the cluster. Accordingly, the behavior of the switch causes further copies of the file across each of the existing proxies. Since a large number of requests for a given file may be present at any one time, the L4 switch will naturally fill all caches with copies of the file generally without regard to how large the cache cluster (number of servers) is made. While it may be possible to cache a single copy to a designated cache, and vend it to clients all at once (via multicast techniques, and the like) within a given time frame, this may involve unacceptable delays for certain clients. The result of the filling of all caches for a long period of time is that other content is delayed due to the resulting congestion.

One solution to the problem of congestion is to address-partition the storage of files in the cache. L4 switches typically include functions for selectively routing requests to a particular cache without regard to the load-balancing imperative based upon a specific cache location for the file. This would ensure that other caches remain free of the over-requested file. However, this may involve the use of internal hashing functions with respect to the requested file's URL, that ties up processor time, thus delaying the switch's load-balancing operations. As caching arrangements become increasingly efficient, this often undesirably slows the system. In addition, L4 switches often cannot distinguish between large and small files. Where files are small (example 50 Kbytes or less) it is generally more efficient to allow load-balancing unmodified by the invention to occur, regardless of the number of request for a given file.

It is an object of the present invention to provide a technique for address-partitioning a proxy cache cluster and associated proxy partition cache (PPC) that enables address partitioning at the proxy cache at the cache situs without an external load-balancing mechanism, thereby freeing the L4 switch from any additional address partitioning responsibilities. The PPC architecture should thereby relieve congestion, and overfilling of the caches with duplicate copies of large files.

SUMMARY OF THE INVENTION

The present invention overcomes the disadvantages of the prior art by providing a proxy partition cache (PPC) architecture and a technique for address-partitioning a proxy cache consisting of a grouping of discrete, cooperating caches (servers) by redirecting or reassigning client requests for objects (files) of a given size to a single cache in the grouping notwithstanding the cache to which the request is made by the L4 switch based upon load-balancing considerations. The file is then returned to the L4 switch (or another load-balancing mechanism) via the switch-designated cache for vending to the requesting client. The redirection/reassignment occurs according to a function within the cache to which the request is directed so that the L4 switch remains freed from additional tasks that can compromise speed. In this manner, congestion in the caches resulting from over-filling of the entire address space with a particular large file or files is avoided—the particular large file or file being retained on the predetermined cache, to which requests to all other caches are redirected/reassigned.

In a preferred embodiment the PCC is member of a proxy cache cluster consisting of a number of coordinated processor/memory mechanisms (PMMs). The grouping of caches can be interconnected to the L4 switch and associated router by a first network segment. This enables communication with the client via the Internet cloud or another network. A second network segment interconnects the caches to a content server farm in which large files are stored, handled and selectively transferred to the cache as requested. The separate servers can be interconnected via a third network segment that enables redirection of client file requests (where individual server addresses are publicly available), or that enables tunneling (according to known tunneling standards where the servers are non-public) of data between the servers. Each cache is provided with a directory and hashing algorithm (any conventional hashing function can be used). The URL of a client request is subjected to the hash, and the hash result can be processed using, for example, a modulo function with respect to the number of servers in the grouping. This provides a discrete number equal to the number of servers. The file is stored in and retrieved only from the server corresponding to the value provided by the modulo of the hash. In this manner discrete content files are located uniquely within the servers in the group and typically not generally replicated in separate servers. This allows other servers to operate with less congestion from particular large, often-requested files.

In a preferred embodiment the caches can each be adapted to determine a cutoff size for redirection/reassignment of requests. If a requested file/object is below a certain size, then the switch-designated cache server caches and vends the file/object directly. This prevents address-partition resources from being used inefficiently on small, quickly vended objects. In general, a request for an object is referred to a different discrete server unless the discrete server and the original receiving server (as assigned by the oad-balancing mechanism) are identical—whereby the request is optimally processed on the receiving server

BRIEF DESCRIPTION OF THE DRAWINGS

The foregoing and other objects and advantages of the invention will become clearer with reference to the following detailed description as illustrated by the drawings in which.

DETAILED DESCRIPTION OF AN ILLUSTRATIVE EMBODIMENT

Figure 1:
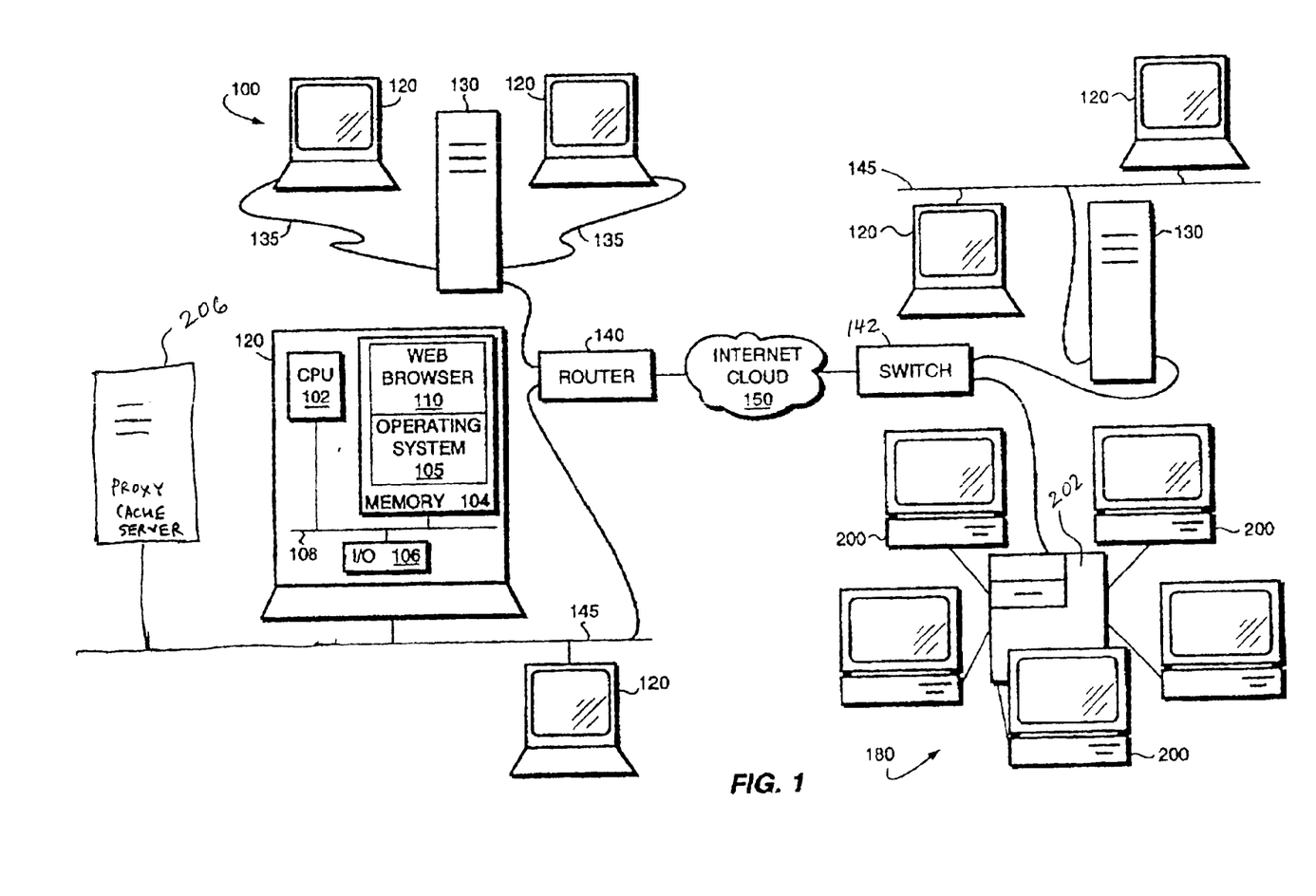
FIG. 1 is a block diagram of a computer internetwork including a collection of network segments connected to a plurality of client and server computers, the latter of which may be organized as a service provider.

FIG. 1 is a schematic block diagram of a computer internetwork 100 comprising a collection of network segments connected to a plurality of computers 120 and servers 130, 200, 202 and 206, as well router 140 and switch units 142. Each computer generally comprises a central processing unit (CPU) 102, a memory 104 and an input/output (I/O) unit 106 interconnected by a system bus 108. The memory 104 may comprise storage locations typically composed of random access memory (RAM) devices, which are addressable by the CPU 102 and I/O unit 106. An operating system 105, portions of which are typically resident in memory and executed by CPU, functionally organizes the computer by, inter alia, invoking network operations in support of application programs executing on the CPU. An example of such an application program is a web browser 110, such as Netscape Navigator® available from Netscape Communications Corporation.

The network segments may comprise local area networks 145 or intranets, point-to-point links 135 and an Internet cloud 150. Collectively, the segments are interconnected by intermediate stations, such as a network switch 142 or router 140, and configured to form an internetwork of computers that communicate by exchanging data packets according to a predefined set of protocols, such as the Transmission Control Protocol/Internet Protocol (TCP/IP). It should be noted that other techniques/protocols, such as Internet Packet Exchange (IPX) protocol and the Hypertext Transfer Protocol (HTTP), may be advantageously used with the present invention.

In the illustrative embodiment, the internetwork 100 is organized in accordance with a client/server architecture wherein computers 120 are personal computers or workstations configured as clients for interaction with users and computers 130, 200 and 202 are configured as servers that perform services as directed by the clients. For example, the servers 200 may be configured to operate as a service provider (e.g., a service provider/web site 180 and are coordinated by a load-balancing server 202) as described further herein, whereas servers 130 may be configured as domain name system (DNS) servers and/or Internet provider servers. In general, the DNS servers provide the clients 120, origin servers and proxies with the network (e.g., IP) address(es) of requested services in response to packets directed to the domain names for those services. The Internet providers, on the other hand, provide Internet access to the clients via, e.g., dial-up telephone lines or cable links.

The client 120 may utilize the web browser 110 to gain access to the web site 180 and to navigate, view or retrieve services stored on the servers 200, hereinafter "web" servers. In order to effectively speed-up access to the service provider and reduce the retrieval time for stored services, one or more web servers may be associated with one or more proxy cache servers 206. While the proxy cache and web server functions can be combined in a single server box, it is more common to divide the web server and proxy caching component and interconnect them via the local area network, or other dedicated connections therebetween. One web server can be associated with a plurality of proxy cache servers. Alternatively, a single proxy cache can be a reverse proxy for many web servers.

Figure 2:
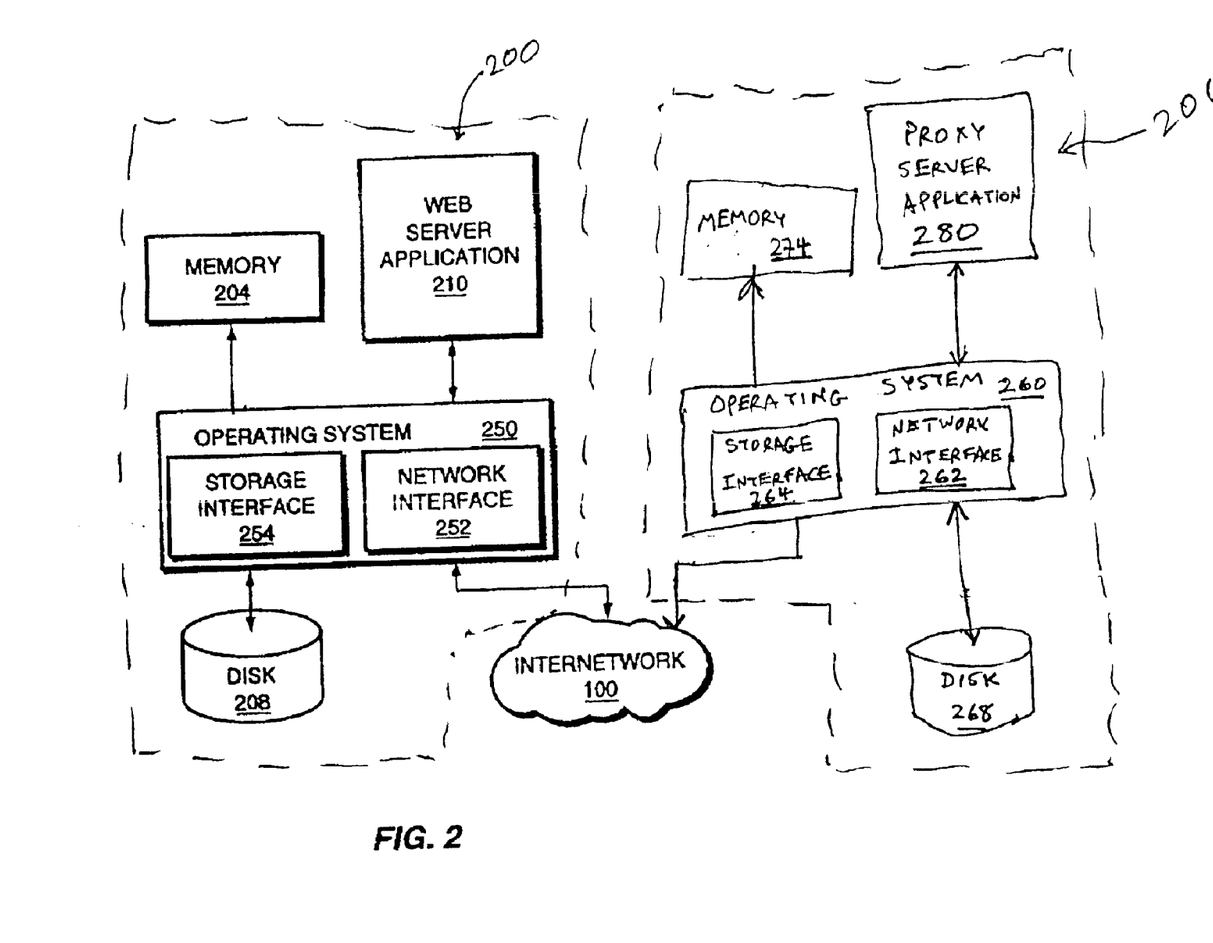
FIG. 2 is a highly schematized diagram of software components of the service provider servers of FIG. 1.

FIG. 2 is a highly schematized diagram of software components of the web server 200 and proxy cache server 206. The web server includes an operating system 250 having utility programs that interact with various application program components to provide, e.g., a storage interface 254 and a network interface 252, the latter enabling communication with a client browser 110 over the internetwork 100. A local memory 204 and disk storage 208 is also provided. The application program components include a web server application 210.

Likewise, the proxy cache server 206 includes an operating system 260 having utility programs that interact with various application program components to provide, e.g., a storage interface 264, a network interface 262. A local memory 274 and disk 268 are also provided to the proxy cache server. In this case, the application program components include a proxy server application ("proxy") 280.

As noted, the reverse proxy 280 "front-ends" the web server such that the network address of the proxy (rather than the actual web site) is published in the DNS server 130 and mapped to the domain name of the service provider. To access a service of the service provider 180, the client sends a request packet directed to the network address of a particular proxy 280 of the web site. The proxy 280 receives the request from the web server and, if the client is authorized to access services from the web site, the proxy attempts to fulfill that request locally from information stored, e.g., in memory 274 or on disk 268—in either case, the memory and/or disk function as a "cache" for quickly storing and retrieving the services. If it cannot satisfy the request, the proxy forwards the request onto the web server application 210. The web server application then responds by transferring a stream of information to the proxy, which stores and forwards the information onto the client browser 10. Although the proxy 280 is shown as a separate platform, it should be noted that the proxy may also be configured to run on the same server platform as the web server.

Figure 3:
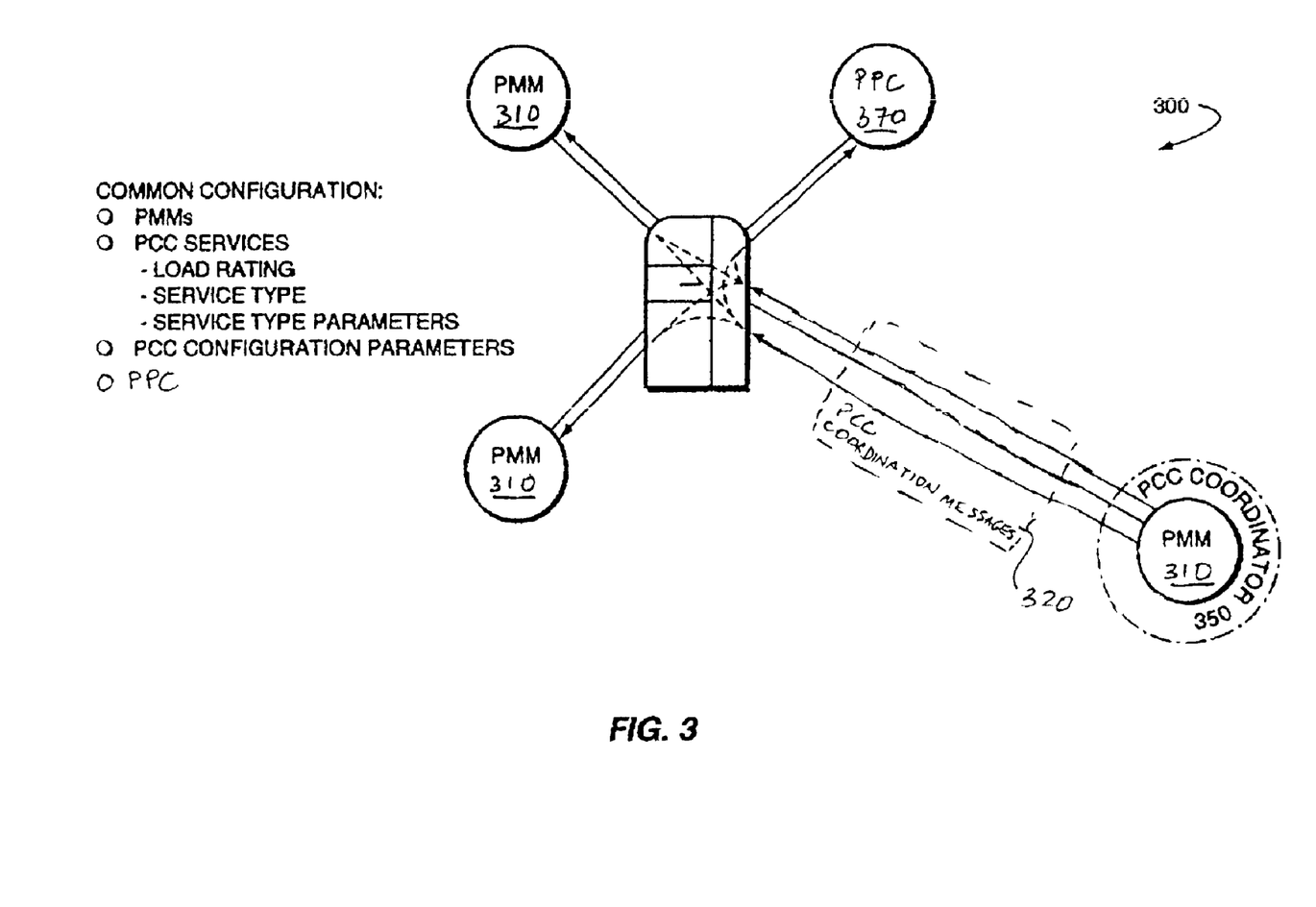
FIG. 3 is a schematic block diagram of a proxy cache cluster (PCC) comprising a group of processor/memory mechanisms (PMMs) that cooperatively interact to host PCC services associated with network addresses of the service provider including an inventive Partition Proxy Cache (PPC) cluster member according to this invention.

By way of background a proxy cache cluster (PCC) "front-ends" the servers of a service provider to increase the availability of services offered by the provider. As noted, the clients access the services by issuing requests to network addresses associated with the services. The PCC increases the availability of the services by receiving and servicing those requests on behalf of the service provider in accordance with a novel proxy cache clustering technique described herein. FIG. 3 is a schematic block diagram of a PCC 300 comprising a cluster of processor/memory mechanisms (PMMs 310) with associated network connectivity that share a common configuration. The PMMs cooperatively interact as a system to host PCC services associated with network addresses of the web site/service provider 180. In fact, the common configuration describes the PCC in terms of the PMMs, static PCC configuration parameters and hosted PCC services, which may include any service that is provided on the World Wide Web—an example of a common web site service is an HTTP service.

According to an aspect of the invention, a PCC service is characterized by (i) a load rating, which is a number/value that reflects a measure of the PCC service's resource consumption, such as the amount of traffic at the web site 180. Notably, the actual value is not specified; just a consistent value to measure the resource consumption metric. Furthermore, the value is a relative value; i.e., relative to load rating of the other services hosted by the PCC. Measurement of this metric can be performed manually or via a software agent that dynamically (event-driven or continuous) assesses the load rating. The agent may comprise conventional instrumentation software, such as a simple network management protocol (SNMP) agent, or any other application that instruments the service to calculate its rating. Calculations are performed using normalized units of measurement to provide flexibility in the ratings and to facilitate dynamic ("on-the-fly") computer-generated measurements, particularly in the event of inclusion of additional PMMs to a cluster in accordance with the novel clustering technique. The agent further maintains (updates) these generated statistics for use when balancing the hosted services across the PCC.

The PCC service is further characterized by (ii) service type, such as an HTTP proxy service, an HTTP accelerator service or a file transfer protocol (FTP) proxy service; further examples of service types include Real Audio, Real Video, NNTP and DNS; and (iii) service type parameters that are unique to each service. Typical examples of conventional parameters run by an HTTP proxy service include (a) a list of network addresses of, e.g., the web site that allows access to the web servers, (b) whether logging is activated, (c) the format of the activated log (common or extended) and (d) the log roll rate. Most web sites that provide an HTTP service run logging operations to determine the type of requests issued by users, the kinds of errors received by those users and the source network addresses of the requests. This latter log provides an indication of geography with respect to, e.g., the locations of the highest concentration of users.

The PMMs are organized as a PCC in accordance with the proxy cache clustering technique that dynamically assigns each PMM to the PCC. To that end, each PMM is configured with a unique identifier (ID), a network address and PCC configuration software to enable participation in the clustering process. The unique ID may be the media access control (MAC) address of a network interface card of the PMM or it may be the network address of the PMM. Once configured and activated, the PMM "listens" for a mechanism notifying the PMM that it is a member of a PCC 300. A designated PMM of the PCC functions as a PCC coordinator 350 to administer the common configuration and, as such, is responsible for assigning PCC service address(es) to each PMM. Coordination messages 320 are passed between the PCC-coordinating PMM 350 and the other PMMs in the cluster. The techniques for organizing and coordinating the various PMMs are described in detail in the above-incorporated U.S. patent application Ser. No. 09/195,982 entitled PROXY CACHE CLUSTER by Brent R. Christensen, et al.

Figure 4:
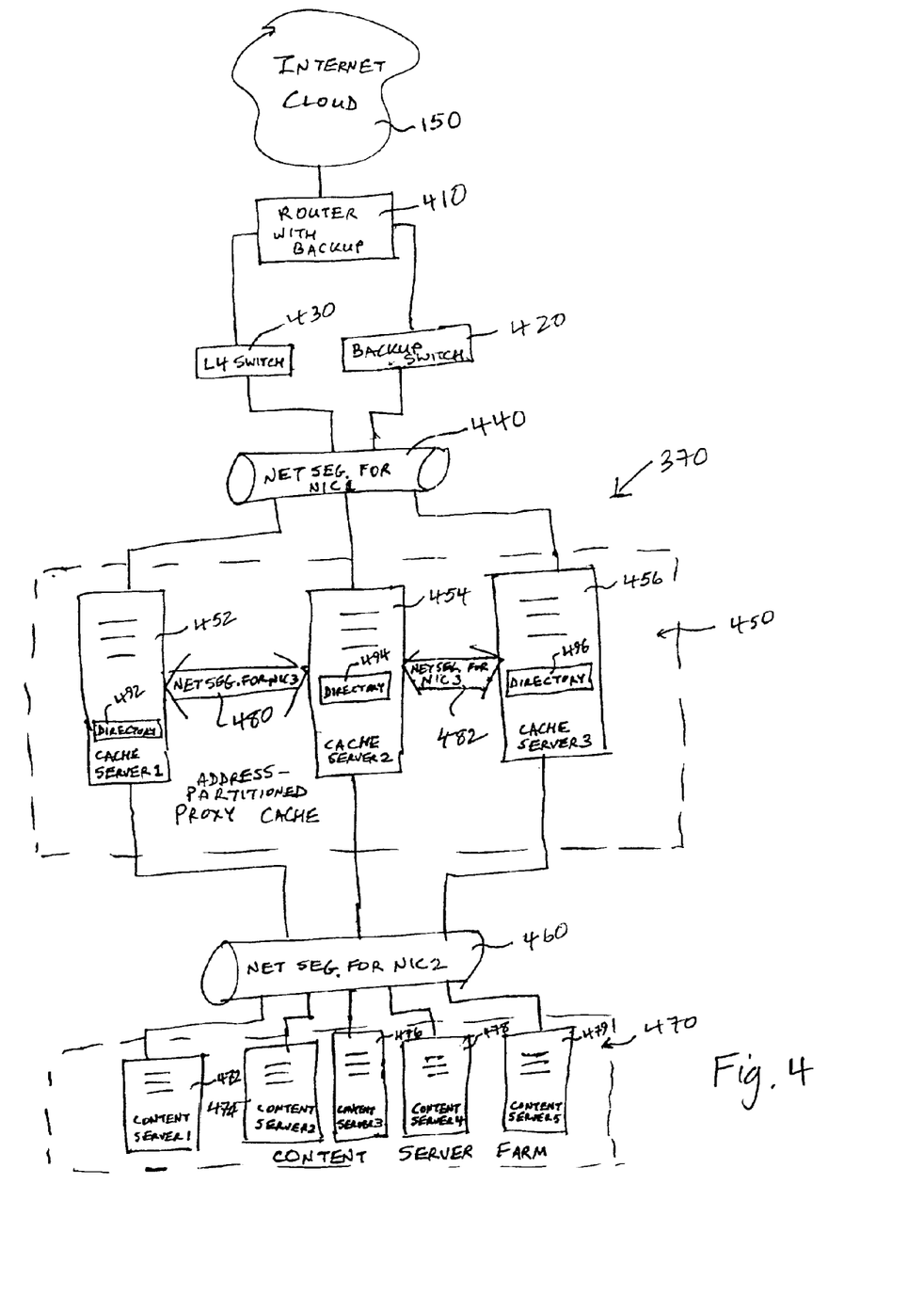
FIG. 4 is a schematic block diagram of a PPC and associated interconnected components of the present invention.

Referring further to FIG. 3, one cluster member is defined as a Partition Proxy Cache (PPC) 370 according to this invention. This cluster member can be handled by the PCC as a PMM, and in communication with the coordinating PMM. FIG. 4 further details the arrangement of the PPC according to an embodiment of this invention. A router 410 with backup functions for retaining information in the event of a failure is provided in communication with the Internet cloud 150. The router receives and transmits data using a TCP/IP protocol based upon the received requests by clients for vended content in the form of data files. The requests can be made in a variety of formats HTTP, file transfer protocol (FTP), and the like. The content file is particularly identified based upon a specific URL associated with the file.

The router 410 is connected through a layer 4 (LA) switch 430. As described generally above, the L4 switch is arranged to provide load-balancing functions to the overall proxy cache address space (452, 454, 456). An optional backup switch 420 is also shown interconnected between the router 410 and downstream server architecture. The backup switch 420 operates as a backup to the L4 switch 430, and its functions and architecture are essentially the same. The L4A switch 430 (and backup switch 420) communicate with the network segment for the network interface card NIC1 (440), typically associated with incoming traffic to the interconnected proxy cache 450. The cache is organized as a group of cooperating proxy cache servers 452, 454 and 456. The servers 452, 454 and 456 can operate in accordance with the commercially available Excelerator from Volera, Inc. of San Jose, Calif. However, any acceptable operating system can be employed. The cache 450 is interconnected to the network segment NIC2 (460), typically associated with outgoing traffic from the cache 450. In this case, NIC2 branches to a content server farm 470 sized and arranged to handle the expected traffic and volume of requested content Individual servers 472, 474, 476, 478 and 479 are shown in this example as part of the server farm 470. Each server handles a certain volume of overall file storage, transferring specific files to the cache when requested. Requested files reside in the cache for a given period that varies based upon a variety of parameters that are generally accepted in the art. Note that interfaces NIC1 and NIC2 need not be exclusive of each other. Accordingly, NIC1 and NIC2 can be the same network interface. If so, NIC1 and NIC2 would share the same network segment in communicating with both the Internet cloud 150 and server farm 470. The cache servers 452, 454 and 456 are themselves-interconnected through a network segment for interface NIC3 (480, 482). This inventive segment 480, 482 is provided to enable redirection or reassignment of a request to a particular cache server despite its normal assignment to any server in the overall cache based upon normal L4 load-balancing procedures. Again, NIC3 can be part of the same network interface card as NIC1 and NIC2 or these functions can be divided in a variety of ways between one or more interfaces. The segments are as separate in part for illustration purposes. However, three discrete interfaces can be used in an embodiment of this invention.

According to one embodiment a form of tunneling is used to transfer requests from one server to another and to receive vended content files. Tunneling is a preferred technique (according to any number of acceptable, currently practiced tunneling techniques; in which an encapsulation of data transferred between servers is employed whereby the data is maintained within a private network) as the addresses of the servers 452, 454 and 456 are typically unpublished with respect to the outside world, and may be defined as 10-net addresses. However, a client redirect procedure can be used according to an alternate embodiment in which the server addresses are available to outside clients. This generally involves a tearing down of the currently established by the client with the site, and the reestablishing of a new connection to the particular server to retrieve the file.

Figure 5:
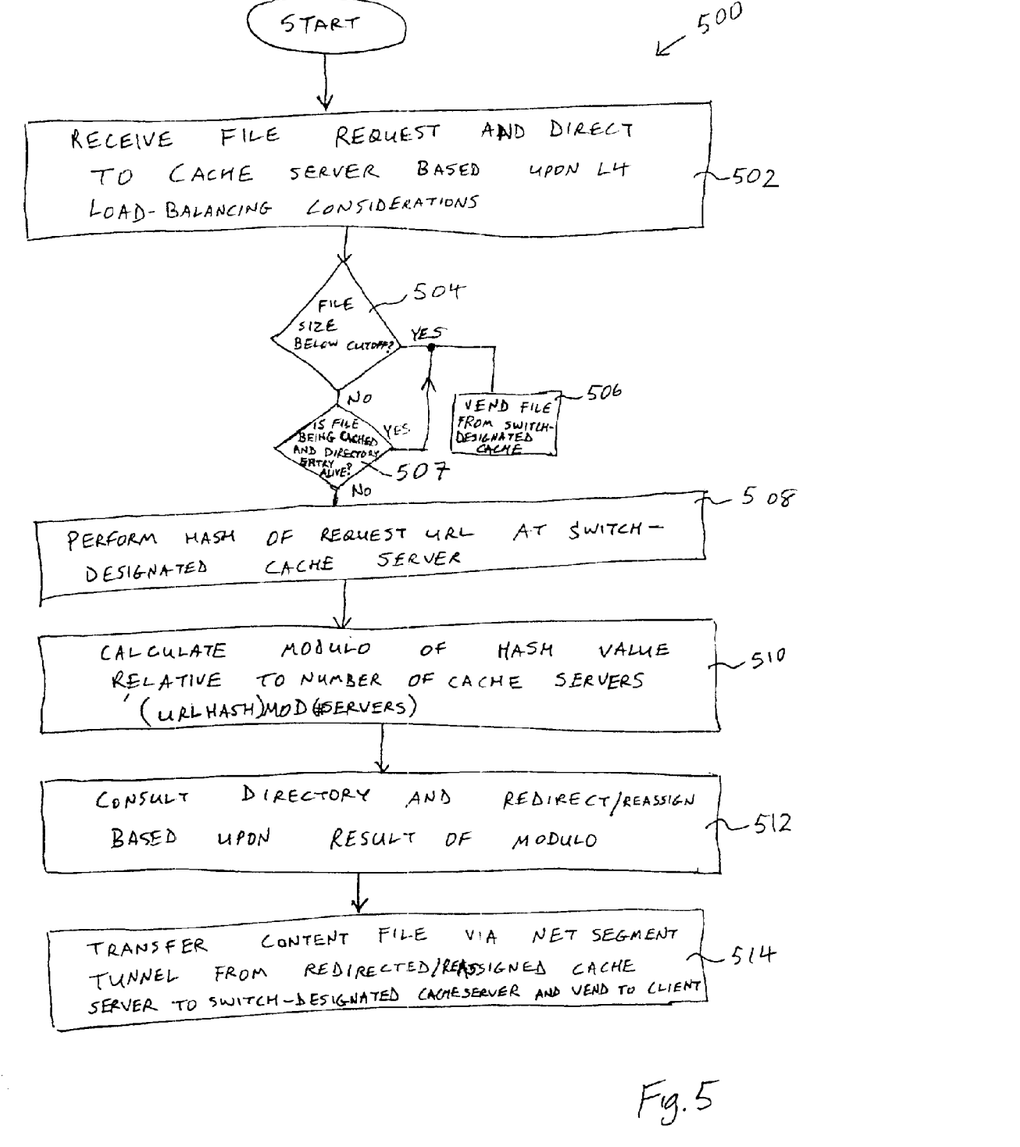
FIG. 5 is a flowchart depicting a sequence of steps associated with a proxy cache-based address partition procedure according to this invention.

With further reference to FIG. 5 the reassignment/redirection procedure 500 is described. In order to accomplish the reassignment of a content request from the switch-selected cache server to the single server assigned to the particular content, the cache servers 452, 454 and 456 each contain a resident directory 492, 494 and 496 and an application for performing a hash of the requested file's URL. The request is received by the switch and directed to a particular server based upon normal load-balancing considerations (step 502). The cache attempts to determine (decision step 504) the file size by analyzing the file size header information in the request or based upon directory information if any. If a requested object's file size information is not available, then the L4-assigned cache is filled with the requested object until a determination as to whether the size of the fill exceeds a cutoff limit. Files under a certain size are not generally subject to redirection and are vended directly from the switch-designated cache (step 506). The cutoff for file size can be based upon the tradeoff between time and bandwidth used to perform the redirection versus the resources used and the impact on overall system performance in having to cache and vend multiple copies of a given-sized file across the entire address space of the cache. In one example a file size of 50 Kbytes is used as a cutoff-wherein files less than 50 Kbytes are handled directly.

If, however, a file is greater than the cutoff size, it may still be vended from the initially requested cache. If a file is being cached and it's directory entry is still alive (e.g. a partition time to live has not expired—decision step 507), then performance considerations may favor completing the fill to the requested cache, and thereby vending the file directly from the requested cache (step 506).

If the file is larger than the cutoff and not otherwise vended from the originally requested cache (e.g. step 507), then its URL is then subjected to the cache's internal hashing function (step 508). Any acceptable hashing function can be employed including a conventional MD-2, MD-3, MD-4 or even checksum-based hash.

In this embodiment, the hash URL value (URLHASH) is then subjected to a modulo arithmetic function (step 510) by the cache defined by the expression (URLHASH)MOD (#CACHESERVERS). This formula advantageously returns an integer value in a range equal to the number of cache servers, assuring that one of the caches is always designated by the solution. The exact technique for reassigning cache servers is highly variable.

The request is then referred or forwarded to the reassigned cache server once the switch-designated cache consults its directory for the appropriate routing information. The request is referred over the NIC3 network segment as a standard HTTP GET request (step 512). The request is received by the reassigned cache and then filled by this cache. This entails the transfer of the file using the tunneling mechanism or another technique back to the switch-designated cache, and then the vending of the content out to the client over the Internet cloud 150 (step 514).

Note that the reassigned cache server may receive a notification alerting it that a forwarded request is to be received so that a forwarding of the request is expected at the reassigned cache. The reassigned cache can be configured to reject the referred request as an unallowed external request when the forwarded request is not recognized as part of the defined redirection system. In other words, the external request is most-likely unauthorized or improperly made.

The L4 switch operates without any knowledge of the cache-based reassignment described above. The cache-based address partitioning technique provides a substantial increase in efficiency and concomitant reduction in cache congestion, as all requests for a given file remain on a designated cache regardless of the number of requests and their timing. Even where the connection must be tom down and reestablished, as in a redirection of the client, the increased resources used to do so are offset significantly by the reduction in underlying cache congestion.

Note that it is contemplated that, where there are significant increases in server numbers and associated traffic, the teachings herein can be adapted so that a given file is cached on a plurality of servers rather one. The number of servers is preset, or can be dynamically altered. Redirection or tunneling of a file request from a switch-designated server to one of the plurality of specified servers, tasked to cache the particular file, can be made according to a variety of techniques.

The following is a generalized pseudo-code description of the address partitioning procedure according to an embodiment of this invention:

```
If the requested object is in the cache and the Partition Time To Live
(TTL) (1) indicates that the object should still be partitioned and the
TTL indicates that the object is still fresh {
  If the Cache Object Store directory entry indicates that this is a
  partitioned object {
    If the object is not oversized (2) {
      Delete the directory entry
      Fill and vend the object from this cache
    }
    Else {
      Get the IP address of the partition member from the directory
      IP address selected is the same as this box (3) {
        Fill and vend the object from this cache
      }
      Else }
        If the partition member is still up (4) {
          If not allowing a direct connect (5) {
            Forward the request to the appropriate
            cache and tunnel the response
          }
          Else {
            Send an indication to the appropriate
            cache to expect a client connection(6)
            Redirect the client to the appropriate cache
          }
        }
        Else {
          Select the IP address of the partition member
          to handle the oversized object (7)
          Mark the directory entry to indicate that this
          is a partitioned object
          Mark the directory entry with the Partition TTL
          Store the partition member IP address in the
          directory
          If the IP address selected is the same as this
          box {
            Fill and vend the object from this
            cache
          }
          Else {
            If not allowing a direct connect {
              Forward the request to the appropriate
              cache and tunnel the response
            }
            Else {
              Send an indication to the appropriate
              cache to expect a connection from
              the client
              Redirect the client to the appropriate
              cache
            }
          }
        }
      }
    }
  }
  Else {
    Vend the requested object from this cache (8)
  }
}
Else {
  Start the fill from the origin serve (9)
  If the content size in the header or the size of the proceeding
  fill (10) indicates that the object is oversized
  {
    Select the IP address of the partition member to handle the over-
    sized object (11)
    Mark the directory entry to indicate that this is a
    partitioned object
    Mark the directory entry with the PartitionTTL
    Store the partition member IP address in the directory
    If the IF address selected is the same as this box {
      Continue the fill of oversized object and vend object (12) }
    Else {
      Abort the fill
```

-continued

```
        If not allowing a direct connect {
            Forward the request to the appropriate cache and
            tunnel the response {
            Else {
                Send an indication to the appropriate cache to
                expect a connection from the client
                Redirect the client to the appropriate cache
            }
        }
    }
    Else {
        Continue the fill and vend the object
    }
}.
```

The Cache Object Store directory is described in the above-incorporated OBJECT CACHE STORE Patent Application. With reference to the above listing the following components apply to the steps numbered in parenthesis:

1. TTL value is needed to determine how long an object should be considered fresh while being partitioned. This provides a mechanism to check to see if the object should be moved to another partition member before the object actually becomes stale.

2. In this case the object was previously oversized but no longer meets that criteria (e.g. the administrator changed the oversized object threshold).

3. This box is the partition member that should fill the request.

4. This will be determined via the membership services provided by the current PCC mechanism.

5. The administrator has determined that the IP addresses of the cache boxes are not to be made available for a direct connection from an outside client.

6. Direct connections are allowed by outside clients. This function provides advanced warning to the partition member to receive the request that the request is coming. This will allow the partition member to deny any direct connections that are not expected.

7. Since the previous partition member is not available we must select a new one.

8. There is no reason to force cache partitioning if the object is in the cache. We will wait until the cache object becomes stale or is replaced because of cache contention. This will be an issue only when the cache partition is started or is reconfiguring after a partition member is leaving/joining. However, the most common case here will be that the object is in the cache of the partition member to handle the oversized object 9. We need to discover the size of the object.

10. Sometimes the server does not send the size header; in this case we continue the fill until we see that it is a large object at which time this logic kicks in.

11. This will be done by hashing the URL and taking the modulo based on the number of IP addresses handling the cache partitioning (this should effectively partition the address space of oversized objects among the partition members). We can use the "PCC membership services" to maintain a list of active and alive partition members (using the existing heart-beat, maintenance beat interval, failure-mode beat interval, etc. as described in the above-incorporated PROXY CACHE CLUSTER Patent Application).

If the membership number changes (thus changing the modulo) a new member will be chosen to handle the redefined partition. When the lost member returns, its cache will still be valid (excepting ITL expiration) and the objects filled by other members will finally expire and leave the cache because of a lack of requests.

12. This is the default behavior of the partition member that should handle the oversized object.

The foregoing has been a detailed description of a preferred embodiment of the invention. Various modifications and additions can be made without departing from the spirit and scope thereof. For example the clustering of PMMs can vary from that depicted. The organization of the internetwork components can also vary from that shown as can the nature of the components. In addition, while an L4 switch is used to accomplish load-balancing, it is expressly contemplated that any acceptable mechanism for achieving load-balance between caches can be employed according to this invention and the term "load-balancing mechanism" should be taken broadly to include any such mechanism including an L4 switch, Layer 3 (L3) switch or other network switch. Finally, it is expressly contemplated that any of the operations described herein can be implemented in hardware, software—in the form of a computer-readable medium comprising program instructions-or a combination of hardware and software. Accordingly, this description is meant to be taken only by way of example, and not to otherwise limit the scope of the invention.

What is claimed is:

1. A proxy partition cache architecture for vending objects to requesting clients comprising:

a plurality of proxy cache servers for caching and vending objects from a storage location to a requesting client through an interconnected load-balancing mechanism adapted to selectively provide client requests to each of the plurality of proxy cache servers based upon load-balancing considerations;

a network segment interconnecting each of the proxy cache servers so as to enable data to pass between the proxy cache servers; and a mechanism in each server of the plurality of proxy cache servers adapted to (a) receive a request for an object from the load-balancing mechanism, (b) identify a discrete server of the plurality of proxy cache servers that is designated to contain the object, based upon an address of the object, if a size of the object exceeds a cutoff value (c) referring the request to the discrete server if the size of the object exceeded the cutoff value and (d) return the object from the discrete server to the server receiving the request from the load-balancing mechanism for vending to the client unless the size of the object is below the cutoff value in which case the object is available or otherwise acquired directly from the server receiving the request and vended to the client.

2. The proxy partition cache architecture as set forth in claim 1 wherein the mechanism includes means for the request to the discrete server to be referred over the network segment unless the discrete server and the receiving server are identical, whereby the request is optimally processed on the receiving server.

3. The proxy partition cache architecture as set forth in claim 1 wherein the mechanism includes means for performing a hash function on the address of the object.

4. The proxy partition architecture as set forth in claim 3 wherein the mechanism includes a means for performing a modulo function on a hash of the address with respect to a number of proxy cache servers in the plurality of proxy cache servers.

5. The proxy partition architecture as set forth in claim 1 wherein the load-balancing mechanism comprises a network switch interconnected to the proxy cache servers.

6. The proxy partition architecture as set forth in claim 1 wherein the mechanism includes means for delivering the request to the discrete server and for tunneling the object through the server receiving the request from the discrete server to the load-balancing mechanism.

7. The proxy partition architecture as set forth in claim 1 wherein the mechanism includes means for enabling a redirection of the client request to the discrete server from the server receiving the request from the load-balancing mechanism.

8. A method for address-partitioning a proxy cache defined by a group of proxy cache servers for vending objects to requesting clients comprising:
    caching and vending objects from a plurality of proxy cache servers to a requesting client through an interconnected load-balancing mechanism, including selectively providing client requests to each of the plurality of proxy cache servers based upon load-balancing considerations;
    interconnecting each of the proxy cache servers through a network segment so as to enable data to pass between the proxy cache servers;
    in each server of the plurality of proxy cache servers, (a) receiving a request for an object from the load-balancing mechanism, (b) identifying a discrete server of the plurality of proxy cache servers that is designated to contain the object, based upon an address of the object, (c) referring the request to the discrete server over the network segment and (d) returning the object from the discrete server to the server receiving the request from the load-balancing mechanism for vending to the client; and
    skipping (b)–(d) if a size of the object is below a cutoff value and directly vending the object to the client from the server which initially received the request for the object.

9. The method as set forth in claim 8 further comprising referring the request to the discrete server over the network segment unless the discrete server and the receiving server are identical, whereby the request is optimally processed on the receiving server.

10. The method as set forth in claim 8 wherein the step of identifying includes performing a hash function on the address of the object.

11. The method as set forth in claim 10 wherein the step of identifying includes performing a modulo function on a hash of the address with respect to a number of proxy cache servers in the plurality of proxy cache servers.

12. The method as set forth in claim 8 wherein the load-balancing mechanism comprises a Layer 4 (L4) switch.

13. The method as set forth in claim 8 wherein the steps of referring and returning each include delivering the request to the discrete server and tunneling the object through the server receiving the request from discrete server to the load-balancing mechanism.

14. The method as set forth in claim 8 further comprising allowing vending of a file from a server other than the one selected by the modulo mechanism based upon of a directory entry that indicates a current server location and data freshness of the file.

15. A computer-readable medium including program instructions for address-partitioning a proxy cache defined by a group of proxy-cache servers for vending objects to requesting clients, the computer-readable medium including instructions for performing the steps of:
    caching and vending objects from a plurality of proxy cache servers to a requesting client through an interconnected load-balancing mechanism, including selectively providing client requests to each of the plurality of proxy cache servers based upon load-balancing considerations;
    interconnecting each of the proxy cache servers through a network segment so as to enable data to pass between the proxy cache servers;
    in each server of the plurality of proxy cache servers, (a) receiving a request for an object from the load-balancing mechanism, (b) identifying a discrete server of the plurality of proxy cache servers that is designated to contain the object, based upon an address of the object, (c) referring the request to the discrete server over the network segment and (d) returning the object from the discrete server to the server receiving the request from the load-balancing mechanism for vending to the client; and
    skipping (b)–(d) if a size of the object is below a cutoff value and directly vending the object to the client from the server which received the request.

16. A proxy partition cache architecture for vending objects to requesting clients comprising:
    a plurality of proxy cache servers for caching and vending objects from a storage location to a requesting client through an interconnected load-balancing mechanism adapted to selectively provide client requests to each of the plurality of proxy cache servers based upon load-balancing considerations;
    a network segment interconnecting each of the proxy cache servers so as to enable data to pass between the proxy cache servers; and
    a mechanism in each server of the plurality of proxy cache servers adapted to (a) receive a request for an object from the load-balancing mechanism, (b) identify a discrete server of the plurality of proxy cache servers that is designated to contain the object, based upon an address of the object, (c) referring the request to the discrete server and (d) return the object from the discrete server to the server receiving the request from the load-balancing mechanism for vending to the client, wherein the mechanism includes means for enabling a redirection of the client request to the discrete server from the server receiving the request from the load-balancing mechanism and the mechanism further includes means for notifying the discrete server to receive the referred request so that a client redirection is expected, and allowing the discrete server to reject the request when the request is not recognized as a referred request by the mechanism.

17. A proxy partition cache architecture for vending objects to requesting clients comprising:
    a plurality of proxy cache servers for caching and vending objects from a storage location to a requesting client through an interconnected load-balancing mechanism adapted to selectively provide client requests to each of the plurality of proxy cache servers based upon load-balancing considerations;
    a network segment interconnecting each of the proxy cache servers so as to enable data to pass between the proxy cache servers; and
    a mechanism in each server of the plurality of proxy cache servers adapted to (a) receive a request for an object from the load-balancing mechanism, (b) identify a discrete server of the plurality of proxy cache servers that is designated to contain the object, based upon an address of the object, (c) referring the request to the discrete server and (d) return the object from the discrete server to the server receiving the request from the load-balancing mechanism for vending to the client, wherein the mechanism includes means for allowing vending of a file from a server other than the one selected by the modulo mechanism based upon a directory entry that indicates a current sever location and data freshness of the file.

18. A method for address-partitioning a proxy cache defined by a group of proxy cache servers for vending objects to requesting clients comprising:

caching and vending objects from a plurality of proxy cache servers to a requesting client through an interconnected load-balancing mechanism, including selectively providing client requests to each of the plurality of proxy cache servers based upon load-balancing considerations;

interconnecting each of the proxy cache servers through a network segment so as to enable data to pass between the proxy cache servers; and in each server of the plurality of proxy cache servers, (a) receiving a request for an object from the load-balancing mechanism, (b) identifying a discrete server of the plurality of proxy cache servers that is designated to contain the object, based upon an address of the object, (c) referring the request to the discrete server over the network segment and (d) returning the object from the discrete server to the server receiving the request from the load-balancing mechanism for vending to the client;

wherein the steps of referring and returning include redirecting of the client request to the discrete server from the server receiving the request from the load-balancing mechanism.

19. The method of claim 18, further comprising notifying the discrete server to receive the referred request so that a client redirection is expected, and allowing the discrete server to reject the request as an unallowed external request when the request is not recognized as allowable.

* * * * *